US007024588B2

(12) United States Patent
Imai et al.

(10) Patent No.: US 7,024,588 B2
(45) Date of Patent: Apr. 4, 2006

(54) SYSTEM MONITORING SYSTEM AND MONITORING METHOD

(75) Inventors: Kenichiro Imai, Tokyo (JP); Mitsuyasu Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 09/755,236

(22) Filed: Jan. 5, 2001

(65) Prior Publication Data

US 2001/0008020 A1 Jul. 12, 2001

(30) Foreign Application Priority Data

Jan. 7, 2000 (JP) ............................ 2000-001743

(51) Int. Cl.
*G06F 11/273* (2006.01)

(52) U.S. Cl. ........................... 714/28; 714/25; 714/39; 700/26

(58) Field of Classification Search .................. 714/25, 714/27, 28, 39; 700/26, 27, 93
See application file for complete search history.

(56) References Cited

U.S. PATENT DOCUMENTS 4,433,413 A * 2/1984 Fasang ....................... 714/732
4,720,778 A 1/1988 Hall et al.
5,625,785 A * 4/1997 Miura et al. .................. 714/38
5,943,498 A * 8/1999 Yano et al. ................. 717/128
5,964,893 A * 10/1999 Circello et al. ............... 714/39
6,016,557 A * 1/2000 Kasprzyk et al. ............. 714/38
6,026,501 A * 2/2000 Hohl et al. ................... 714/38
6,314,530 B1 * 11/2001 Mann .......................... 714/38
6,321,331 B1 * 11/2001 Roy et al. ................... 712/244
6,615,370 B1 * 9/2003 Edwards et al. .............. 714/45

FOREIGN PATENT DOCUMENTS

FR 2 721 725 12/1995
FR 2 748 833 11/1997
FR 2748833 A1 * 11/1997
JP 11282713 A * 10/1999

OTHER PUBLICATIONS

Machine Translation of Japanese Patent 11-282713 from the Japanese Patent Office Website.*
English Translation of FR 2748833 A1, "Information Storage System for Real Time Monitoring of a Digital Computer".*

* cited by examiner

*Primary Examiner*—Robert Beausoliel
*Assistant Examiner*—Joseph D Manoskey
(74) *Attorney, Agent, or Firm*—Frommer Lawrence & Haug LLP; William S. Frommer; Thomas F. Presson

(57) ABSTRACT

A system monitoring unit uses an external debugging unit to monitor the state of an internal CPU when a control program stored in a memory of a target system controls an internal CPU of the system to operate via an internal bus of the system. The system monitoring unit includes an internal-bus-address comparing circuit for detecting, in real time, based on information on the internal bus, information on the accessing of the internal bus by the internal CPU. By outputting the information on the accessing of the internal bus by the internal CPU to the debugging unit, the system monitoring unit can output the state of the internal bus while controlling the internal CPU to operate.

2 Claims, 2 Drawing Sheets

SYSTEM MONITORING SYSTEM AND MONITORING METHOD

BACKGROUND OF THE INVENTION

1. Field of the Invention

The present invention relates to a system monitoring unit suitable for, for example, system debugging.

2. Description of the Related Art

Conventionally, for debugging a program in a target system, an in-circuit emulator has been used that emulates the operation of a central processing unit (CPU) of the target system.

In debugging using the in-circuit emulator, there are two known techniques. In one (see Japanese Unexamined Patent Application Publication Nos. 11-108998 and 7-21054), after stopping the operation of an internal CPU, a serial transmission line is used to transmit a predetermined command from a debugging unit. In another (see Japanese Unexamined Patent Application Publication No. 11-232134), by using a testing chip corresponding to an internal CPU, predetermined commands are transmitted from a debugging unit to all signal lines in the chip.

In the first technique, a debugging circuit must be separately provided, and internal information obtained during the operation of the internal CPU cannot be output because debugging must be performed when the internal CPU has been ordered to stop.

In the second technique, developing the testing chip requires time and money, and it is difficult to develop a testing chip which is suitable for use with high-speed execution speed of internal CPUs.

SUMMARY OF THE INVENTION

Accordingly, it is an object of the present invention to provide a system monitoring system that has a simplified construction for outputting internal information irrespective of the operation of the an internal CPU, and a system monitoring method.

To this end, according to an aspect of the present invention, the foregoing object is achieved through provision of a system monitoring system including an external monitoring unit for monitoring the state of a controller in an apparatus to be monitored, the state being obtained when a control program stored in storage unit in the apparatus controls, via an internal bus of the apparatus, the controller to operate, and a bus-access detection unit for detecting, in real time, based on internal bus information, information on the accessing of the internal bus by the controller. The information on the accessing of the internal bus by the controller is output to the external monitoring unit with the timing of the accessing.

According to another aspect of the present invention, the foregoing object is achieved through provision of a system monitoring method for monitoring, by an external monitoring unit, the state of a controller in an apparatus to be monitored, the state being obtained when a control program stored in storage unit in the apparatus controls, via an internal bus of the apparatus, the controller to operate. The system monitoring method including the steps of using a bus-access detection unit to detect, in real time, based on internal bus information, information on the accessing of the internal bus by the external monitoring unit, and outputting the information on the accessing of the internal bus by the monitoring unit to the external monitoring unit with timing of the accessing.

According to the present invention, while operating a controller in an apparatus to be monitored, an internal bus of the apparatus can be output. This enables the monitoring of the accessing of the internal bus. In addition, by using an external monitoring unit, an efficiency of developing a storage unit and the controller can be increased.

According to the present invention, an execution address of a controller in an apparatus to be monitored can be monitored.

According to the present invention, the accessing of an internal bus in an apparatus to be monitored can be monitored in real time.

According to the present invention, an event representing an execution program by a controller of an apparatus to be monitored can be monitored in real time.

According to the present invention, real-time bus monitoring is realized in which data on an internal bus of an apparatus to be monitored can be displayed when the internal bus is accessed.

DESCRIPTION OF THE PREFERRED EMBODIMENTS

With reference to the accompanying drawings, the present invention is described below.

Compared with a conventional system monitoring unit that can output the internal state of the apparatus to the exterior, only in the break state in which an internal CPU of a chip in an apparatus to be monitored is in a debug mode and in the stopped operation, a system monitoring unit according to an embodiment of the present invention can output, in real time, information on the accessing of an internal bus of the apparatus irrespective of the operation mode and internal state of the CPU.

Figure 1:
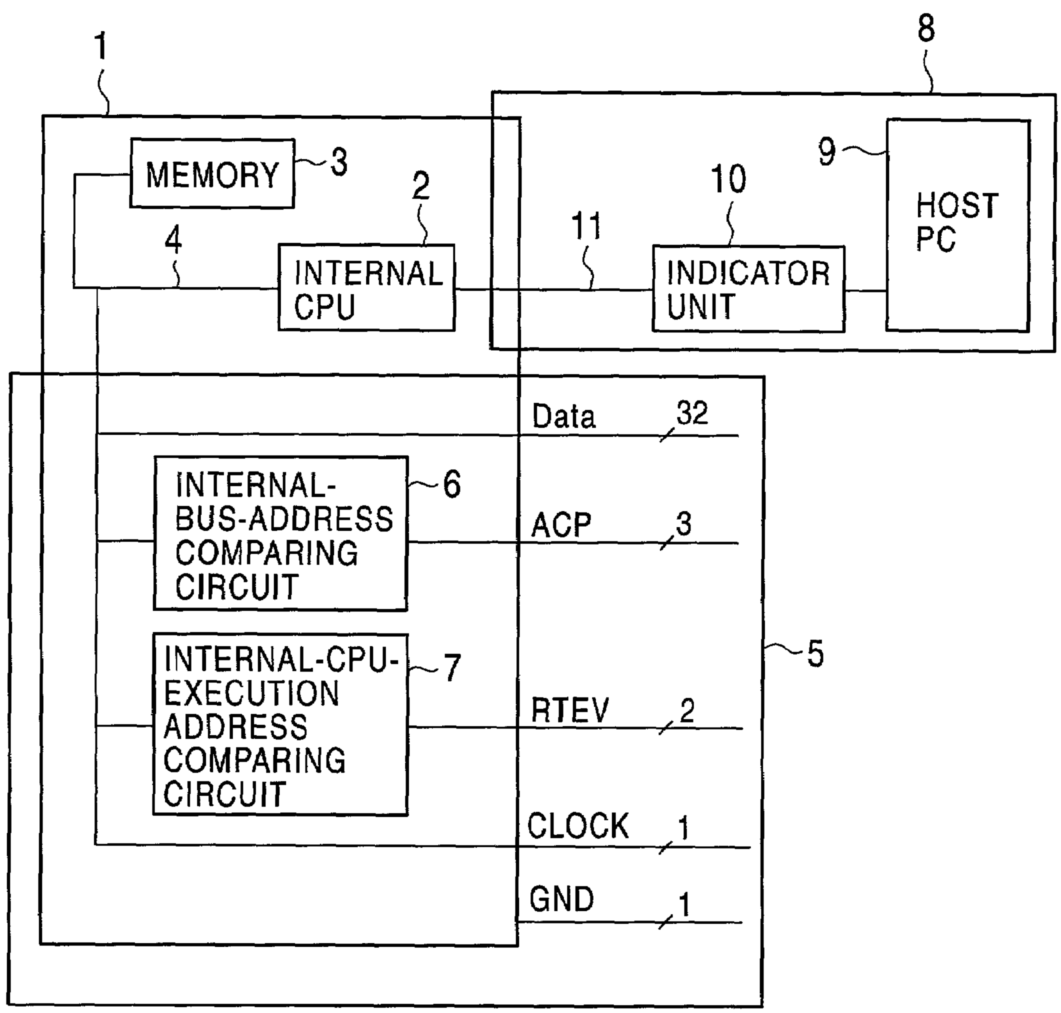
FIG. 1 is a block diagram showing a real-time bus-monitor system to which a system monitoring unit according to an embodiment of the present invention is applied.

FIG. 1 shows a real-time bus monitoring system to which the system monitoring unit according to the embodiment of the present invention is applied.

This system includes a target system 1 in which debugging is performed and a debugging unit 8. The target system 1 includes an internal CPU 2 as a controller, a memory 3 as a random access memory containing a control program, and an internal bus 4. In this embodiment, the real-time bus monitoring system also includes an internal bus monitor 5.

The internal bus monitor 5 includes an internal-bus-address comparing circuit 6. The internal-bus-address comparing circuit 6 detects, in real time, information on the accessing of the internal bus 4 by the internal CPU 2 based on information on the internal bus 4, and outputs the detected information to the debugging unit 8 with timing of the accessing of the internal bus 4 by the internal CPU 2.

In this embodiment, the internal bus monitor 5 also includes an internal-CPU-execution-address comparing circuit 7. The internal-CPU-execution-address comparing circuit 7 detects, in real time, information on an execution address of the internal CPU 2 based on the information of the internal bus 4, and outputs the detected information to the debugging unit 8.

The debugging unit 8 includes a host personal computer (PC) 9 that uses a predetermined command 11 to control debugging for the target system 1, and an indicator unit 10 that displays both information on the accessing of the internal bus 4 by the internal CPU 2 and information on an execution address of the internal CPU 2.

The internal-bus-address comparing circuit 6 has a function of generating a hit signal when an address line of the internal bus 4 matches an address set by the host PC 9 as a result of the comparison between the address line and the set address.

The internal-CPU-execution-address comparing circuit 7 has a function of generating a hit signal when an execution address of the internal CPU 2 matches the address set by the host PC 9 as a result of the comparison between the execution address and the set address.

The internal bus monitor 5 directly outputs 32-bit data "Data" based on the internal bus 4, a 1-bit clock signal "CLOCK", and a 1-bit ground signal "GND" to the indicator unit 10 in the debugging unit 8. The internal-bus-address comparing circuit 6 in the internal bus monitor 5 outputs a 3-bit access-point signal "ACP" based on the internal bus 4, which is the hit signal from the internal-bus-address comparing circuit 6, to the indicator unit 10 in the debugging unit 8. The internal-CPU-execution-address comparing circuit 7 in the internal bus monitor 5 outputs a 2-bit real-time event signal "RTEV" based on the internal bus 4, which is the hit signal from the internal-CPU-execution-address comparing circuit 7, to the indicator unit 10 in the debugging unit 8.

Figure 2:
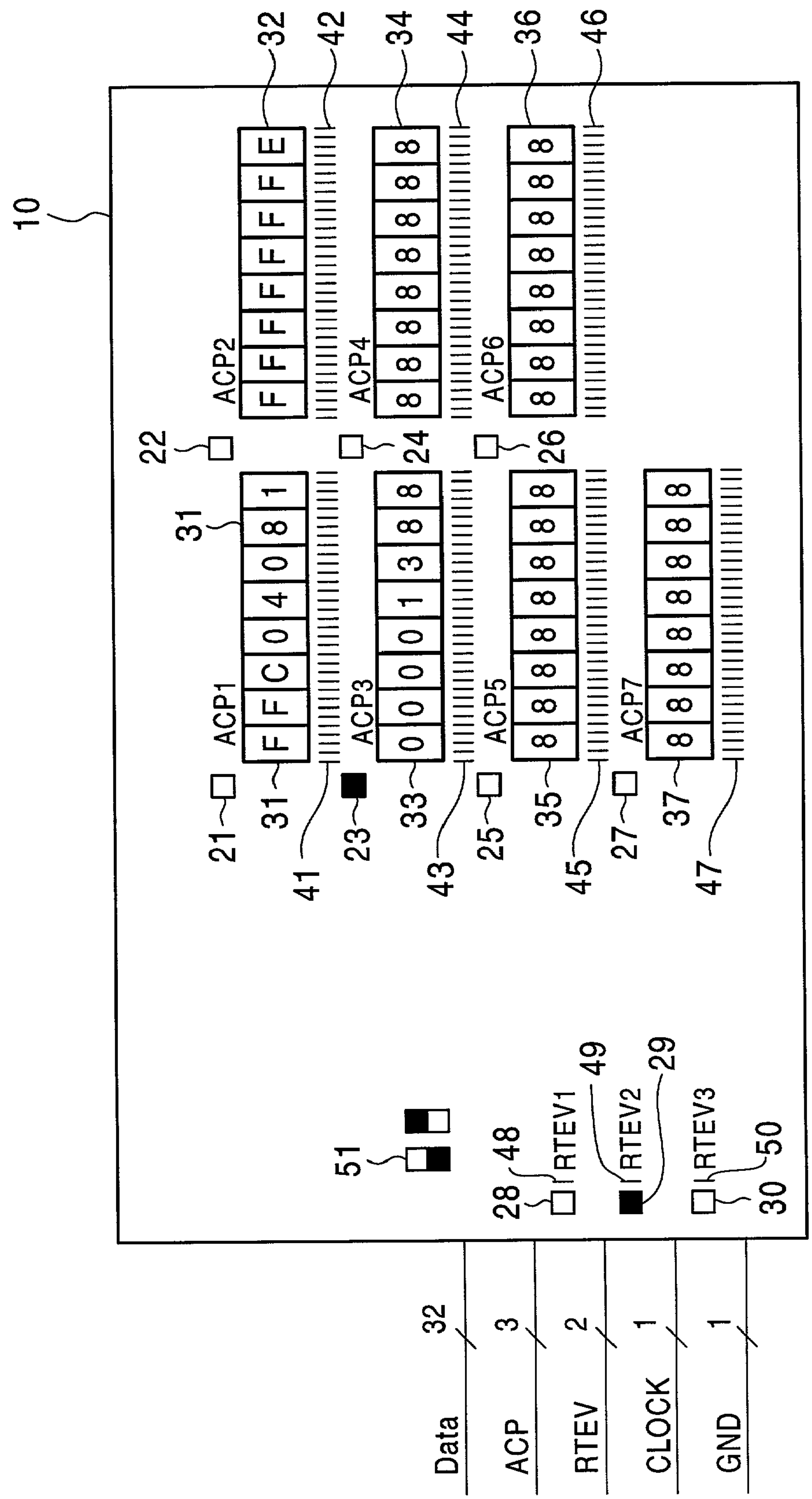
FIG. 2 is an illustration of an indicator unit 10 of the real-time bus-monitor system shown in FIG. 1.

Referring to FIG. 2, the indicator unit 10 in the debugging unit 8 is described below.

The indicator unit 10 includes light-emitting diodes (LEDs) 21 to 27 that light up access point items ACP1 to ACP7 based on the 3-bit access-point signal "ACP", 7-segment LEDs 31 to 37 that hexadecimally display data on the access point items ACP1 to ACP7, and pins 41 to 47 as metal terminals that use a high or low level to output the lighted ones of the access point items ACP1 to ACP7 and the contents thereof.

The indicator unit 10 also includes LEDs 28 to 30 that light up real-time event items RTEV1 to RTEV3 based on the 2-bit real-time event signal "RTEV", and pins 48 to 50 as metal terminals that use a high or low level to output information on the real-time event items RTEV1 to RTEV3.

The indicator unit 10 includes a switch 51 (e.g., a double dip switch) for setting a hold time that holds (maintains) a previous value when no hit signal is output.

The indicator unit 10 includes a circuit (not shown) for controlling the LEDs 21 to 27 and the 7-segment LEDs 31 to 37 to light up based on data obtained when data on the internal bus 4 is latched with timing of the hit signal by the internal-bus-address comparing circuit 6.

The indicator unit 10 includes a previous value hold circuit (not shown) that holds and displays data latched with the timing of a previous hit signal on the LEDs 21 to 27 and the 7-segment LEDs 31 to 37 when the internal bus 4 is not accessed by the internal CPU 2.

The indicator unit 10 includes a circuit (not shown) for controlling, based on the hit signal by the internal-CPU-execution-address comparing circuit 7, the LEDs 21 to 27 to light up with the timing of the hit signal by the internal-CPU-execution-address comparing circuit 7.

Accordingly, by outputting the information on the accessing of the internal bus 4 by the internal CPU 2 from the internal bus monitor 5 to the debugging unit 8 with the accessing timing, the state of the accessing of the memory 3 by the internal CPU in the target system 1 at an address set by the debugging unit 8 is indicated by the indicator unit 10, and a run state at a particular address in the internal CPU 2 is indicated by the indicator unit 10. This makes it possible to monitor the state of the accessing of the address of the memory 3 by the internal CPU 2 and the run state at the particular address in the internal CPU 2.

The real-time bus monitoring system having the above-described construction performs the following operations.

First, referring to FIG. 1, the operation of the internal-bus-address comparing circuit 6 is described below. The host PC 9 in the debugging unit 8 designates an address (a maximum of seven addresses in this embodiment) in the memory 3 in the target system 1. The internal-bus-address comparing circuit 6 holds the designated address. When the internal CPU 2 writes or reads data at the designated address in the memory 3 via the internal bus 4, the internal-bus-address comparing circuit 6 outputs the corresponding 3-bit access-point signal "ACP".

The host PC 9 controls the internal-bus-address comparing circuit 6 to perform address setting for the memory 3. There are two items to be set: an address in the memory 3 which corresponds to each 3-bit access-point signal "ACP", and an element (hereinafter referred to as a "hit trigger") to trigger the hit signal. The address in the memory 3 is set based on an address map on the internal bus 4. Data types of the 3-bit access-point signal "ACP" to be used as hit triggers are as follows: data "00" represents no hit signal, data "01" represents reading only, data "10" represents writing only, and "11" represents either reading or writing.

Referring to FIG. 1, the operation of the internal-CPU-execution-address comparing circuit 7 is described below.

The host PC 9 in the debugging unit 8 designates an address (a maximum of three addresses in this embodiment) in the memory 3 in the target system 1. The internal-CPU-execution-address comparing circuit 7 holds the designated address. When the internal CPU 2 executes processing at the address, the internal-CPU-execution-address comparing circuit 7 outputs the corresponding 2-bit real-time event signal "RTEV".

The host PC 9 controls the internal-CPU-execution-address comparing circuit 7 to perform instruction-address setting. A setting item sets an instruction address for each 2-bit real-time event signal "RTEV".

Next, the operation of the indicator unit 10 is described below.

Referring to input signals, the following signals are supplied from the internal bus monitor 5 in the target system 1 to the indicator unit 10 via the internal CPU 2. The 3-bit access-point signal "ACP" is a signal generated by the internal-bus-address comparing circuit 6.

The 3-bit binary values of the 3-bit access-point signal "ACP" correspond to the decimal values 0 to 7, respectively. Decimal value "0" represents no accessing of the memory 3 at any set address. Decimal value "1" represents the accessing of the memory 3 at ACP1 indicating the address of access point 1. Decimal value "2" represents the accessing of the memory 3 at ACP2 indicating the address of access point 2. Decimal values "3" to "6" represent similar correspondences. Decimal value "7" represents the accessing of the memory 3 at ACP7 indicating the address of access point 7.

However, when, among seven addresses in the memory 3, two addresses are set identically, it is assumed that the hit signal is generated only at access point ACPX corresponding to the least value X.

Next, the 2-bit real-time event signal "RTEV" is a signal generated by the internal-CPU-execution-address comparing circuit 7.

The 2-bit binary values of the 2-bit real-time event signal "RTEV" correspond to decimal values 0 to 3, respectively. Decimal value "1" indicates that a command set at RTEV1 indicating the address of an executed command has been executed. Decimal value "2" indicates that a command set at RTEV2 indicating the address of an executed command has been executed. Decimal value "3" indicates that a command set at RTEV3 indicating the address of an executed command has been executed.

However, when, among three addresses in the memory 3, two addresses are set identically, it is assumed that the hit signal is generated only at RTEVX corresponding to the least value X.

In addition, the 32-bit data "Data" on the internal bus 4, the 1-bit clock signal "CLOCK", and the 1-bit ground signal "GND" are directly output from the internal bus 4 via the internal bus monitor 5.

Referring to FIG. 2, the indicator unit 10 is described below.

In this embodiment, the indicator unit 10 produces outputs by lighting up a maximum of seven access points ACP1 to ACP7 and a maximum of real-time events RTEV1 to RTEV3.

The indicator unit 10 uses, for example, a data selector or the like to specify, based on the 3-bit access-point signal "ACP", at which of access points ACP1 to ACP7, the memory 3 is accessed, and controls the corresponding one of the LEDs 21 to 27 to light up. A time of holding data for controlling the LEDs 21 to 27 to light up can be set freely.

The indicator unit 10 latches the 32-bit data "Data" with hit timing of the 3-bit access-point signal "ACP", and uses the 7-segment LEDs 31 to 37 corresponding to the access points ACP1 to ACP7 to hexadecimally display the updated data.

For example, the 7-segment LED 31 indicates "FFC04081", the 7-segment LED 32 indicates "FFFFFFFF", the 7-segment LED 33 indicates "00001388", the 7-segment LED 34 indicates "88888888", the 7-segment LED 35 indicates "88888888", the 7-segment LED 36 indicates "88888888", and the 7-segment LED 37 indicates "88888888". If no 3-bit access-point signal "ACP" is generated, the 7-segment LEDs 31 to 37 indicate data corresponding to the previous value held by the indicator unit 10.

The indicator unit 10 uses a high or low level to output the lighted one of the LEDs 21 to 27 corresponding to access points ACP1 to ACP7 and the data in the 7-segment LEDs 31 to 37 to the pins 41 to 47 as metal terminals. The output levels of the pins 41 to 47 can be measured using, for example, a probe of an oscilloscope or a test pin of a tester.

In addition, the indicator unit 10 uses, for example, a data selector or the like to specify, based on the 2-bit real-time event signal "RTEV", one of the real-time event items RTEV1 to RTEV3 at which the command is executed, and controls the corresponding one of the LEDs 28 to 30 to light up. A time of holding data for controlling the LEDs 28 to 30 to light up can be set freely.

The indicator unit 10 uses a high or low level to output the content of the lighted one among the LEDs 28 to 30 to the pins 48 to 50 as metal terminals. The output levels of the pins 48 to 50 can be measured using, for example, a probe of an oscilloscope or a test pin of a tester.

The indicating functions of the LEDs 21 to 27 based on the 3-bit access-point signal "ACP", the indicating functions of the LEDs 28 to 30 based on the 2-bit real-time event signal "RTEV", the output functions of the pins 41 to 47 based on the 3-bit access-point signal "ACP", and the output functions of the pins 48 to 50 based on the 2-bit real-time event signal "RTEV" can separately set an output data holding time.

When no hit signal related to the 3-bit access-point signal "ACP" or the 2-bit real-time event signal "RTEV" is output, the indicator unit 10 can set a hold time for holding a previous value, using the switch 51. For example, by using the switch 51 when it is a double dip switch, 2-bit data setting can select a hold time from among the following four values: 100 ns (5 CLOCKs) represented by data "00", 10 (500 CLOCKs) μs represented by data "01", 1 ms represented by data "10" (50000 CLOCKs), and 100 ms (5000000 CLOCKs) represented by data "11".

Although the above-described embodiment describes a 3-bit access-point signal "ACP" and a 2-bit real-time event signal "RTEV", the number of signals is not limited to the number described above but may be increased in accordance with the number of states. The number of 3-bit access-point signals "ACP" and the number of 2-bit real-time event signals "RTEV" are preferably smaller for reserving the number of pins which is required when a probe of an in-circuit emulator provided in the head of the debugging unit 8 is connected to each pin of the internal CPU 2 in the target system 1. The above-described value, related to the 3-bit access-point signal "ACP" and the 2-bit real-time event signal "RTEV", is the least number of pins to the internal CPU 2 which satisfies the condition.

According to the above-described embodiment, by providing the internal-bus-address comparing circuit 6 or the internal-CPU-execution-address comparing circuit 7 in the internal bus monitor 5, as described above, information on the accessing of the internal bus 4 can be output in real-time by the indicator unit 10.

In addition, by only adding a simple construction to the internal CPU 2 in the target system 1, the above-described real-time bus monitoring system is realized.

Since the information on the accessing of the internal bus 4 is output in real-time based on information on the internal bus 4 in the target system 1, the need for stopping the operation of the internal CPU 2 is eliminated, and the information on the accessing of the internal bus 4 can be obtained in real time.

Moreover, it is not necessary to develop a testing chip. This eliminates time and money for the development.

According to the present invention, while the internal CPU 2 is being operated, the state of the internal bus 4 can be output.

According to the present invention, in addition to the above-described functions, hardware adjustment of the target system 1, a memory mapping function, an input/output mapping function, real-time debugging, and symbolic debugging can be performed as feasible functions by a debugging unit using an ordinary in-circuit emulator.

What is claimed is:

1. A system monitoring system comprising:

external monitoring means for monitoring the state of a controller within an apparatus to be monitored, the state being obtained when a control program stored in storage means in the apparatus controls, via an internal bus of the apparatus, said controller to operate;

bus-access detection means for detecting, in real time, based on internal bus information, each match of an address set with an address line on said internal bus by said controller, said bus-access detection means being external to said controller and internal to said apparatus;

execution address detection means for detecting execution address information of said external monitoring means in real time based on said internal bus information, said execution address detection means being external to said controller and internal to said apparatus;

wherein information on each match and the execution address information are output to said external monitoring means in real time;

a display for said information on each match and said execution address information on said internal bus by said controller; wherein said display numerically displays data on said internal bus when latching the data;

wherein said bus-access detection means generates a hit signal based on a comparison of said internal bus information with access points having predetermined values; and if said internal bus information matches plural access points said hit signal is generated for said access point having a lower predetermined value; and wherein said execution address detection means generates said hit signal based on a comparison of said internal bus information with real-time events having predetermined values; if said internal bus information marches plural real-time events, said hit signal is generated for said real-time event having a lower predetermined value.

2. A system monitoring method for monitoring, by external monitoring means, the state of a controller within an apparatus to be monitored, the state being obtained when a control program stored in storage means in the apparatus controls, via an internal bus of the apparatus, said controller to operate, said system monitoring method comprising the steps of:

using bus-access detection means to detect, in real time, based on internal bus information, each match of an address set with an address line on said internal bus by said monitoring means; said bus-access detection means being external to said controller and internal to said apparatus;

using execution address detection means to detect, in real time, based on said internal bus information, execution address information of said external monitoring means; said execution address detection means being external to said controller and internal to said apparatus;

outputting information on each match and the execution address information to said external monitoring means in real time;

displaying on a display said information on each match and said execution address information by said monitoring means, and numerically displaying data on said internal bus when latching the data;

wherein said bus-access detection step generates a hit signal based on a comparison of said internal bus information with access points having predetermined values; and if said internal bus information matches plural access points said hit signal is generated for said access point having a lower predetermined value; and wherein said execution address detection step generates said hit signal based on a comparison of said internal bus information with real-time events having predetermined values; if said internal bus information matches plural real-time events, said hit signal is generated for said real-time event having a lower predetermined value.

* * * * *